United States Patent
Ishikawa et al.

(10) Patent No.: US 12,536,393 B2
(45) Date of Patent: Jan. 27, 2026

(54) WIRELESS TAG COMMUNICATION APPARATUS

(71) Applicant: TOSHIBA TEC KABUSHIKI KAISHA, Tokyo (JP)

(72) Inventors: Hiroyuki Ishikawa, Sunto Shizuoka (JP); Nanami Shinozaki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/919,523

(22) Filed: Oct. 18, 2024

(65) Prior Publication Data

US 2025/0265427 A1   Aug. 21, 2025

(30) Foreign Application Priority Data

Feb. 20, 2024   (JP) .................. 2024-023750

(51) Int. Cl.
*G06K 7/10*   (2006.01)
(52) U.S. Cl.
CPC ............................... *G06K 7/10366* (2013.01)
(58) Field of Classification Search
CPC ................................................. G06K 7/10366
See application file for complete search history.

(56) References Cited

U.S. PATENT DOCUMENTS 11,205,166 B2   12/2021   Imamura et al.
2006/0214774 A1*   9/2006   Mochida ............... G06K 7/0008
340/10.2

FOREIGN PATENT DOCUMENTS

EP   3454309   3/2019
JP   2021-110985   8/2021

* cited by examiner

*Primary Examiner* — Jamara A Franklin
(74) *Attorney, Agent, or Firm* — Amin, Turocy & Watson, LLP

(57) ABSTRACT

Provided is a wireless tag communication apparatus that detects a target wireless tag with high accuracy and reads information. A wireless tag communication apparatus according to an embodiment includes at least one antenna, a reading apparatus, and a drive apparatus. The antenna is disposed below a table where an article attached with a wireless tag is placed. The reading apparatus communicates with the wireless tag via the antenna, detects the wireless tag within a placement range on the table where the article is placed, and reads information from the wireless tag within the placement range. The drive apparatus moves the antenna inside the placement range.

20 Claims, 9 Drawing Sheets

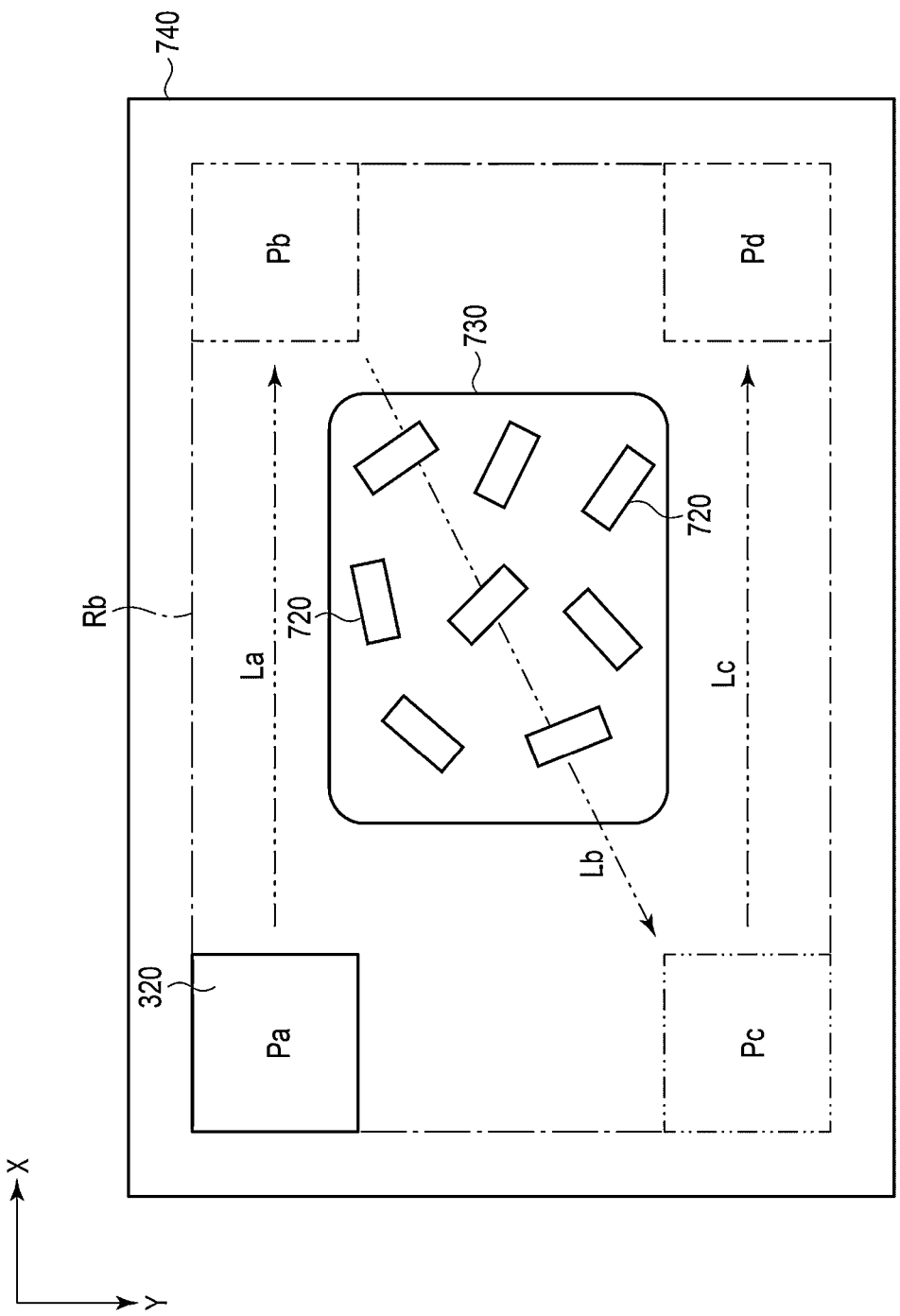

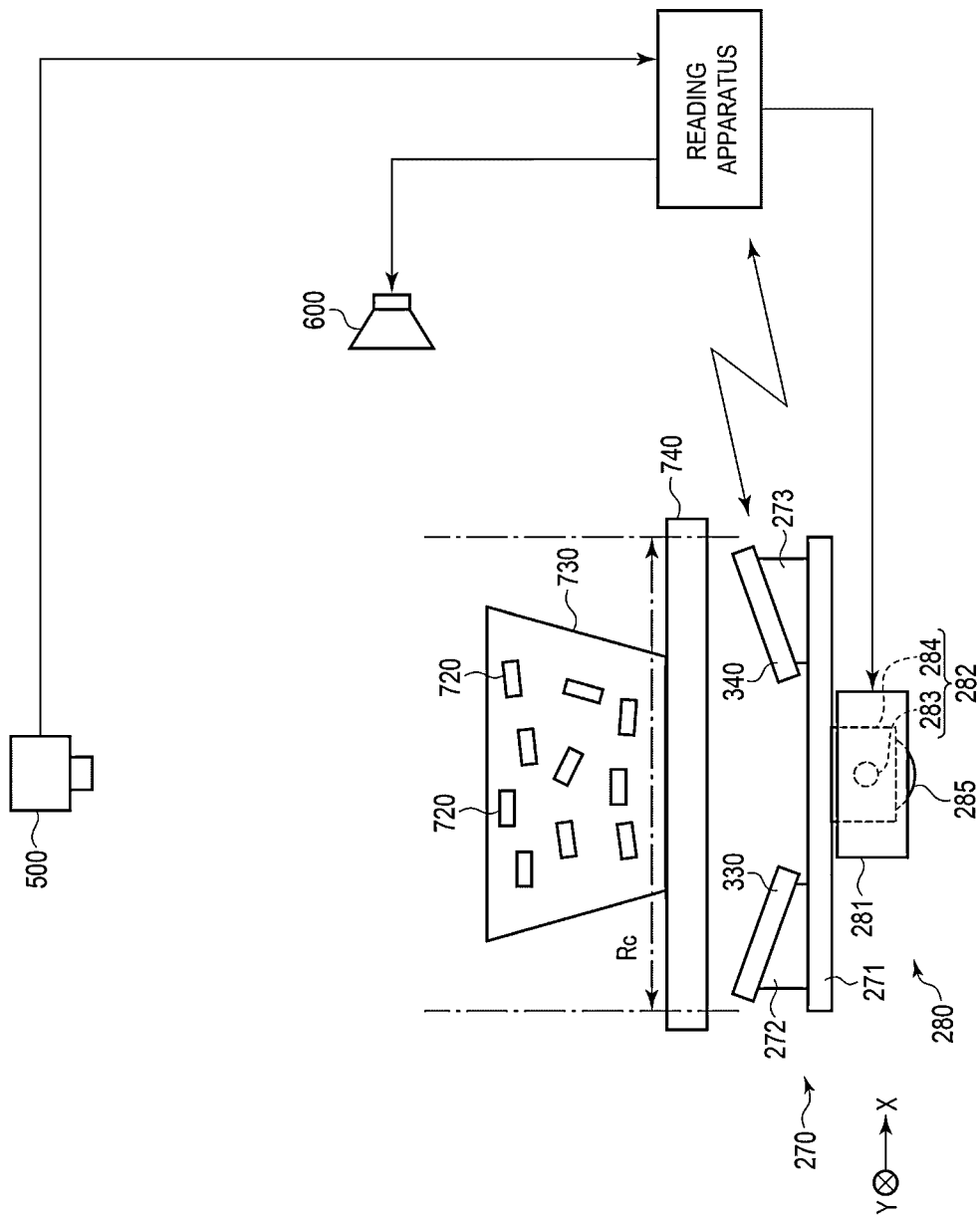

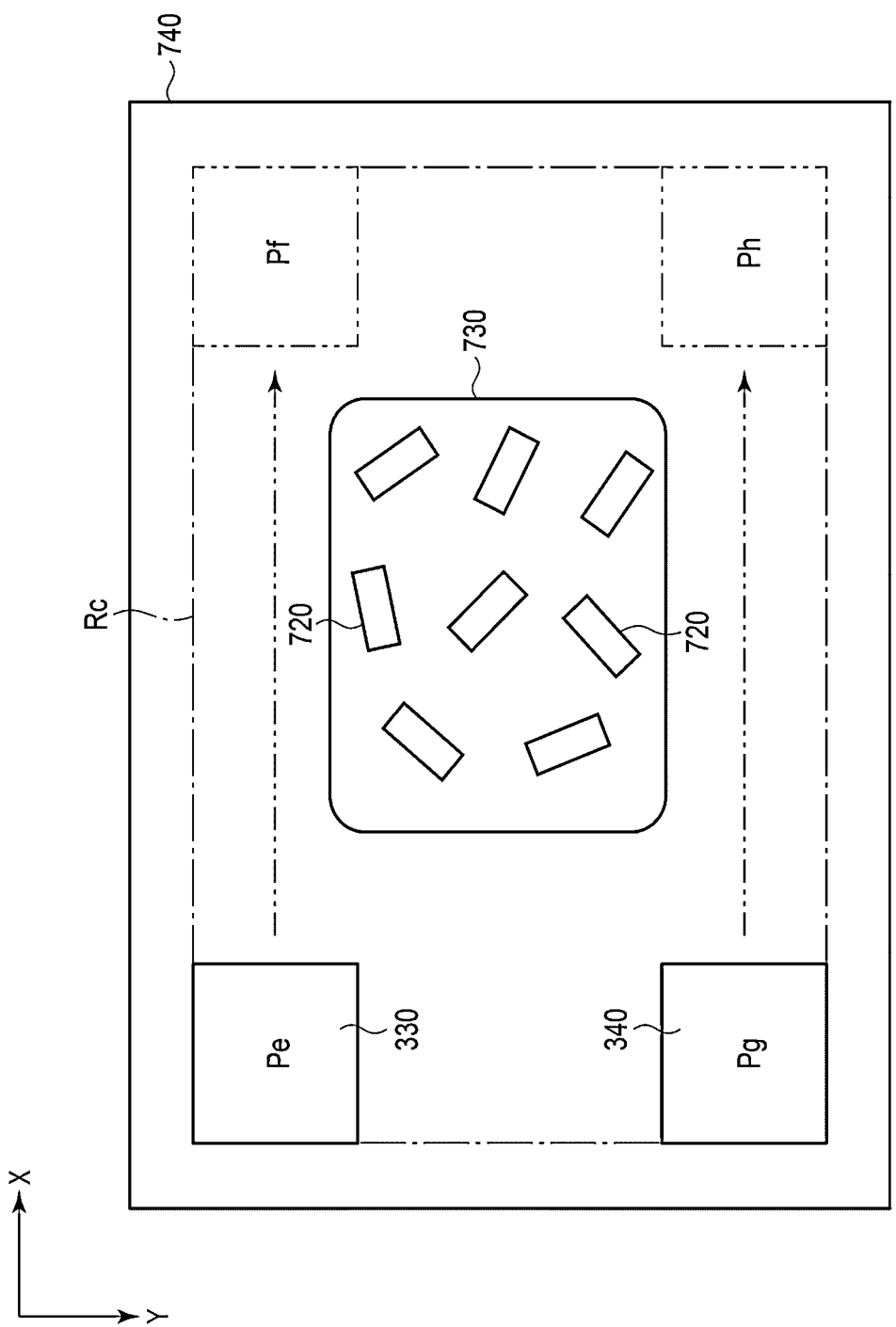

WIRELESS TAG COMMUNICATION APPARATUS

CROSS-REFERENCE TO RELATED APPLICATION

This application is based upon and claims the benefit of priority from Japanese Patent Application No. 2024-023750, filed on Feb. 20, 2024, the entire contents of which are incorporated herein by reference.

FIELD

Embodiments described herein relate generally to a wireless tag communication apparatus and a wireless tag communication method.

BACKGROUND

In recent years, in order to perform a payment process, wireless tags are increasingly used instead of barcodes that are used conventionally.

In such a system, a wireless tag is attached to an article, the wireless tag is detected by a wireless tag communication apparatus, and information is read from the wireless tag. When exposed to electromagnetic wave emission, the wireless tag transmits an electromagnetic wave in response to the emission. The wireless tag communication apparatus emits an electromagnetic wave from an antenna and receives the electromagnetic wave transmitted from the wireless tag in response to the electromagnetic wave by the antenna, thereby detecting the wireless tag and reading information from the wireless tag.

DESCRIPTION OF THE DRAWINGS

FIG. 7 is a plan view schematically showing the example of the configuration of the wireless tag communication apparatus.

FIG. 8 is a side view schematically showing an example of a configuration of a wireless tag communication apparatus according to a third embodiment.

FIG. 9 is a plan view schematically showing the example of the configuration of the wireless tag communication apparatus.

DETAILED DESCRIPTION

Figure 1:
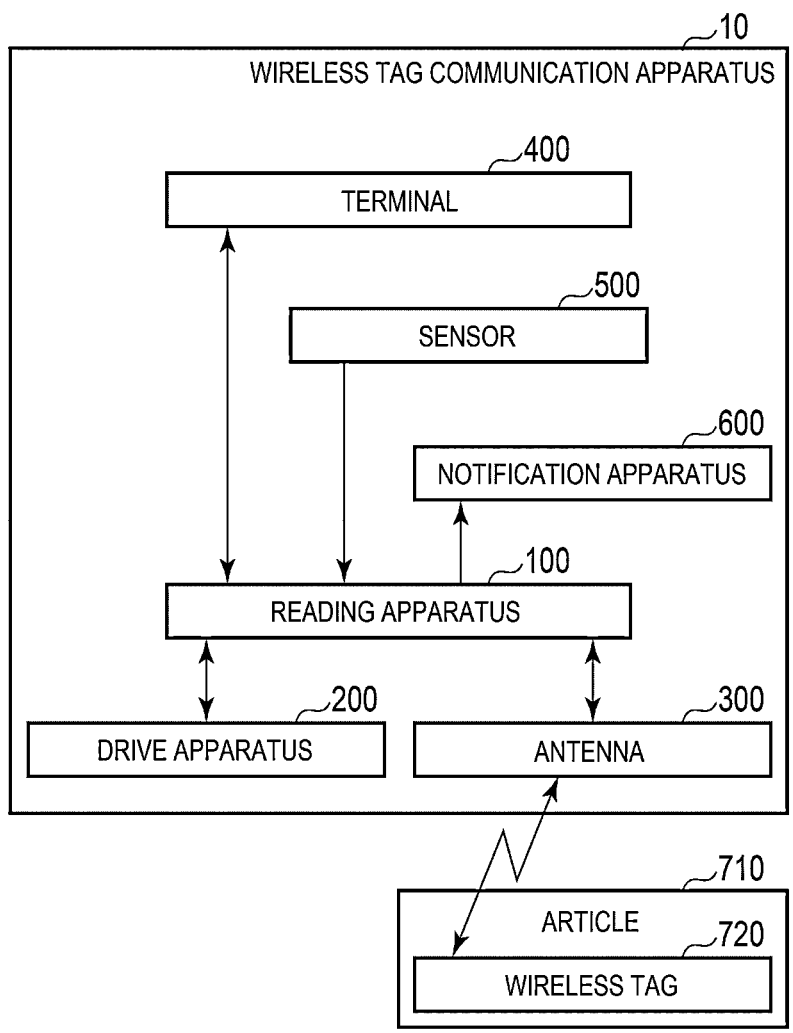
FIG. 1 is a block diagram of an example of a configuration of a wireless tag communication apparatus according to an embodiment.

A wireless tag communication apparatus may also detect a non-target wireless tag located around a target wireless tag. Therefore, it is desirable that the wireless tag communication apparatus detects the target wireless tag with high accuracy and selectively reads information of the target wireless tag.

A problem to be solved by the disclosure is to provide a wireless tag communication apparatus that detects a target wireless tag with high accuracy and reads information.

A wireless tag communication apparatus according to an embodiment includes at least one antenna, a reading apparatus, and a drive apparatus. The antenna is disposed below a table where an article attached with a wireless tag is placed. The reading apparatus communicates with the wireless tag via the antenna, detects the wireless tag within a placement range on the table where the article is placed, and reads information from the wireless tag within the placement range. The drive apparatus moves the antenna inside the placement range.

Hereinafter, embodiments will be described with reference to the drawings. In the drawings referred to in the description of the embodiments, a scale of each part may be appropriately changed. In addition, each drawing may show an abbreviated configuration for a purpose of description.

Wireless Tag Communication Apparatus

First, a wireless tag communication apparatus 10 according to an embodiment will be described with reference to FIG. 1. FIG. 1 is a block diagram of an example of a configuration of the wireless tag communication apparatus 10 according to the embodiment.

The wireless tag communication apparatus 10 determines whether a wireless tag 720 attached to an article 710 such as a commodity is within a predetermined range, and when the wireless tag 720 is within the predetermined range, reads information from the wireless tag 720 and processes the read information.

FIG. 1 shows one article 710 and one wireless tag 720 for convenience, but this is not intended to indicate the number of the articles 710 and the wireless tags 720. The number of the articles 710 and the wireless tags 720 may be one or plural, and in general, is often plural. One wireless tag 720 is attached to one article 710.

The wireless tag communication apparatus 10 includes a reading apparatus 100, a drive apparatus 200, an antenna 300, a terminal 400, a sensor 500, and a notification apparatus 600.

The reading apparatus 100 controls the drive apparatus 200 and the antenna 300 to read the information from the wireless tag 720. A configuration example of the reading apparatus 100 will be described later.

The drive apparatus 200 is an apparatus that moves the antenna 300. A configuration example of the drive apparatus 200 will be described later.

The antenna 300 is a device for communicating with the wireless tag 720. The antenna 300 emits an electromagnetic wave. The antenna 300 receives an electromagnetic wave transmitted from the wireless tag 720 in response to the electromagnetic wave emission. The antenna 300 converts the radio wave received from the wireless tag 720 into a high-frequency signal and outputs the high-frequency signal to the reading apparatus 100.

The terminal 400 is an apparatus that processes the information read from the wireless tag 720 by the reading apparatus 100. The terminal 400 is a personal computer (PC) or the like, and is not limited thereto as long as the terminal 400 is an apparatus that processes information.

The sensor 500 is a device for acquiring position information of the wireless tag 720. For example, the sensor 500 may be a camera. For example, the reading apparatus 100 may be configured to analyze an image captured by the camera to acquire the position information of the wireless tag 720. Alternatively, the camera itself may be capable of acquiring the position information of the wireless tag 720. The sensor 500 may be any device other than the camera as long as the sensor 500 can acquire the position information of the wireless tag 720.

The notification apparatus 600 is a device that performs information notification. The notification apparatus 600 may be a device that includes a speaker and performs information notification by an audio output. The notification apparatus 600 may be a device that includes a display and performs information notification by an image display. Of course, the notification apparatus 600 may be a device that performs information notification by an audio output and an image display.

The wireless tag 720 is typically a radio frequency identification (RFID) tag. The wireless tag 720 may be another wireless tag. The wireless tag 720 is a passive type wireless tag that operates using a predetermined radio wave transmitted from the antenna 300 as an energy source. The wireless tag 720 transmits a signal including the information stored in the wireless tag 720 by performing backscatter modulation on an unmodulated signal. For example, the information stored in the wireless tag 720 includes identification information that can be uniquely identified. For example, the information stored in the wireless tag 720 includes information on the article 710 to which the wireless tag 720 is attached.

Reading Apparatus

Figure 2:
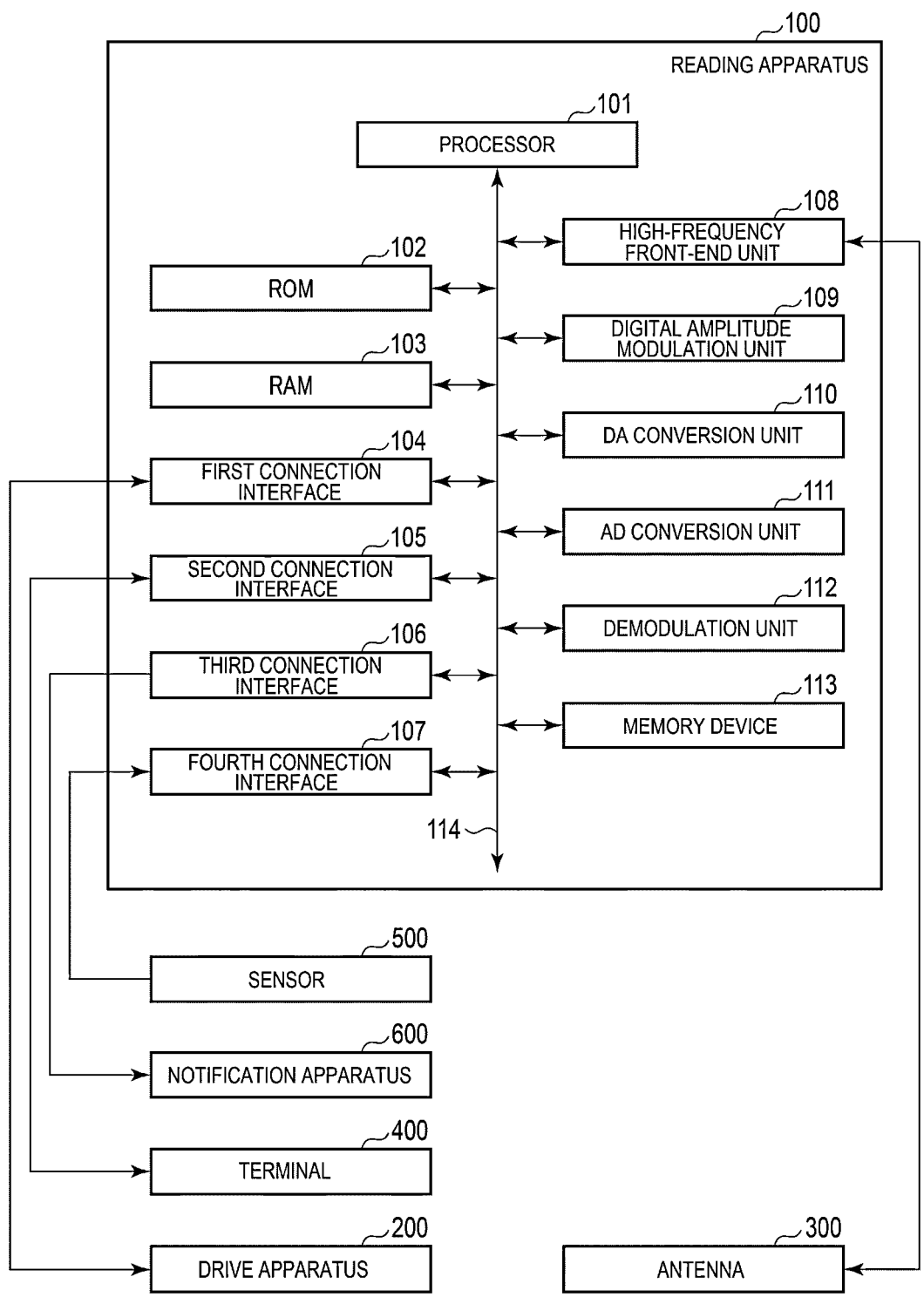
FIG. 2 is a block diagram showing an example of a configuration of a reading apparatus shown in FIG. 1.

Hereinafter, the reading apparatus 100 will be described with reference to FIG. 2. FIG. 2 is a block diagram of an example of a configuration of the reading apparatus 100.

The reading apparatus 100 includes a processor 101, a read-only memory (ROM) 102, a random-access memory (RAM) 103, a first connection interface 104, a second connection interface 105, a high-frequency front-end unit 108, a digital amplitude modulation unit 109, a digital-to-analog (DA) conversion unit 120, an analog-to-digital (AD) conversion unit 111, a demodulation unit 112, and a memory device 113. The units provided in the reading apparatus 100 can communicate with each other via a bus 114.

The processor 101 corresponds to a central part of a computer that performs processing such as calculation and control necessary for an operation of the reading apparatus 100. The processor 101 loads various programs stored in the ROM 102, the memory device 113, or the like into the RAM 103. The processor 101 implements various functions for performing an operation necessary for the operation of the reading apparatus 100 by executing the programs loaded in the RAM 103.

The processor 101 is, for example, a central processing unit (CPU), a micro processing unit (MPU), a system-on-a-chip (SoC), a digital signal processor (DSP), a graphics processing unit (GPU), an application-specific integrated circuit (ASIC), a programmable logic device (PLD), or a field-programmable gate array (FPGA). The processor 101 may be a combination of a plurality of these described above.

The ROM 102 corresponds to a main memory apparatus of the computer including the processor 101 as a center. The ROM 102 is a non-volatile memory used exclusively for reading data. The ROM 102 stores a program for causing the processor 101 to implement each function. The ROM 102 stores data or various setting values used when the processor 101 executes various types of processing.

The RAM 103 corresponds to a main memory apparatus of the computer including the processor 101 as the center. The RAM 103 is a memory used for reading and writing data. The RAM 103 is a work area for storing data used temporarily when the processor 101 executes various types of processing.

The first connection interface 104 is an interface for the reading apparatus 100 to communicate with the drive apparatus 200.

The second connection interface 105 is an interface for the reading apparatus 100 to communicate with the terminal 400.

A third connection interface is an interface for the reading apparatus 100 to communicate with the sensor 500.

A fourth connection interface is an interface for the reading apparatus 100 to communicate with the notification apparatus 600.

The high-frequency front-end unit 108 outputs a high-frequency signal to the antenna 300. The high-frequency front-end unit 108 receives a high-frequency signal from the antenna 300.

The digital amplitude modulation unit 109 adds information to be transmitted to the wireless tag 720 to a carrier wave to be transmitted to the wireless tag 720.

The DA conversion unit 120 converts a digital signal modulated by the digital amplitude modulation unit 109 into an analog signal. The DA conversion unit 120 outputs a high-frequency signal to the antenna 300 via the high-frequency front-end unit 108.

The AD conversion unit 111 converts the high-frequency signal received via the high-frequency front-end unit 108 from the antenna 300 into a digital signal.

The demodulation unit 112 extracts various types of information from the radio wave received from the wireless tag 720. For example, the demodulation unit 112 extracts a unique identification code stored in the wireless tag 720 from the digital signal converted by the AD conversion unit 111. When the radio wave of the wireless tag 720 is received by the antenna 300, the demodulation unit 112 outputs, using a known technique, tag data of the wireless tag 720 in time series based on the digital signal converted by the AD conversion unit 111. The tag data is time-series data based on the radio wave of the wireless tag 720 received by the antenna 300. The tag data includes phase data. The phase data is data indicating a phase of the radio wave from the wireless tag 720. The tag data includes received signal strength indicator (RSSI) data. The received signal strength indicator data is data indicating received signal strength of the radio wave from the wireless tag 720. The tag data may include both the phase data and the received signal strength indicator data.

The memory device 113 is a non-volatile memory that stores data, programs, and the like. The memory device 113 includes a hard disk drive (HDD), a solid state drive (SSD), or the like, and is not limited thereto. The memory device 113 stores a program that causes the processor 101 to implement each function. The memory device 113 also stores data and the like used when the processor 101 executes various types of processing.

The processor 101 implements functions of the reading apparatus 100 by executing a program stored in the ROM 102 or the memory device 113. The functions of the reading apparatus 100 include movement control of the antenna 300 by the drive apparatus 200, communication control via the antenna 300, position determination of the wireless tag 720, information reading from the wireless tag 720, information output to the terminal 400, and the like.

First Embodiment

Figure 3:
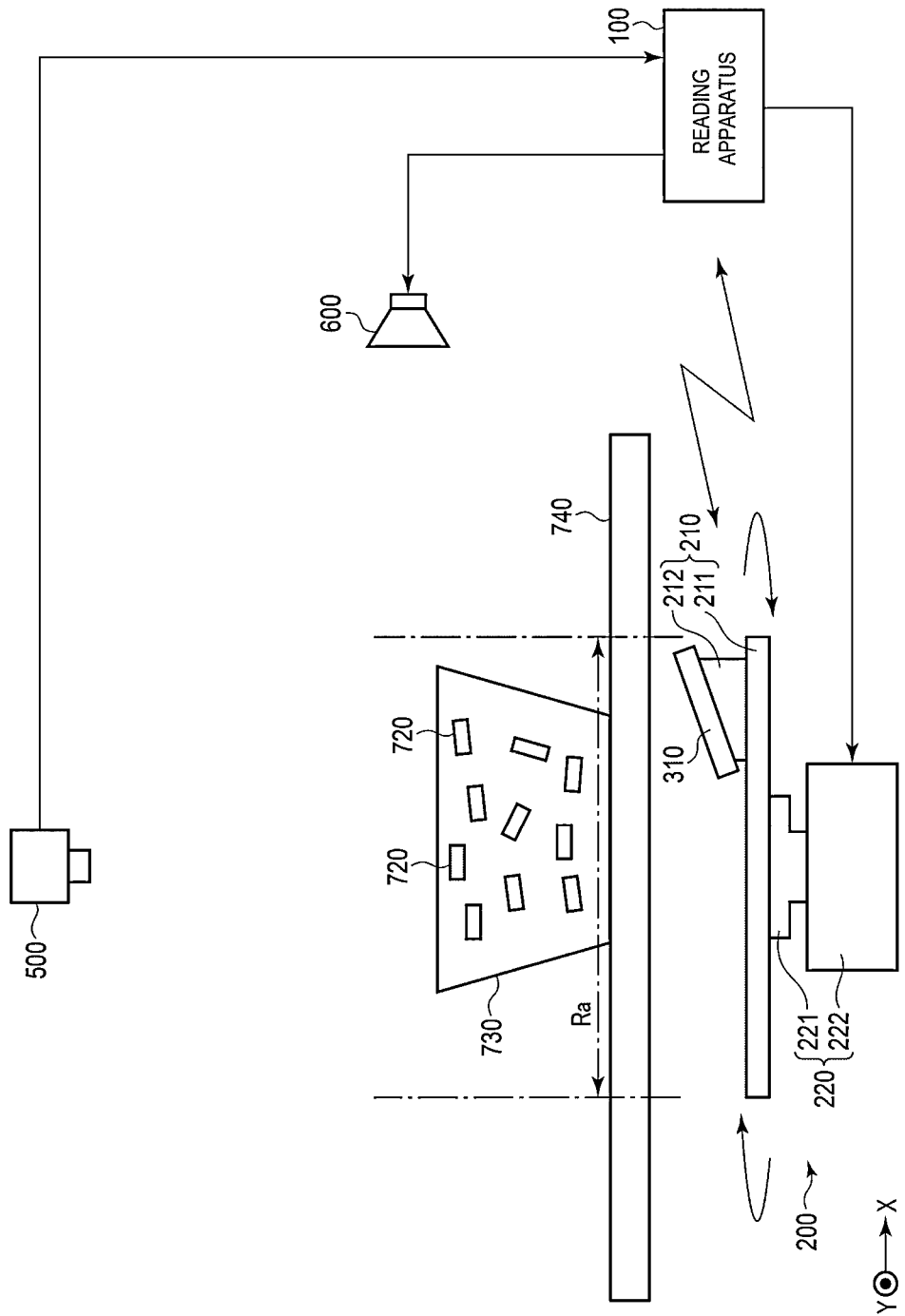
FIG. 3 is a side view schematically showing an example of a configuration of a wireless tag communication apparatus according to a first embodiment.
Figure 4:
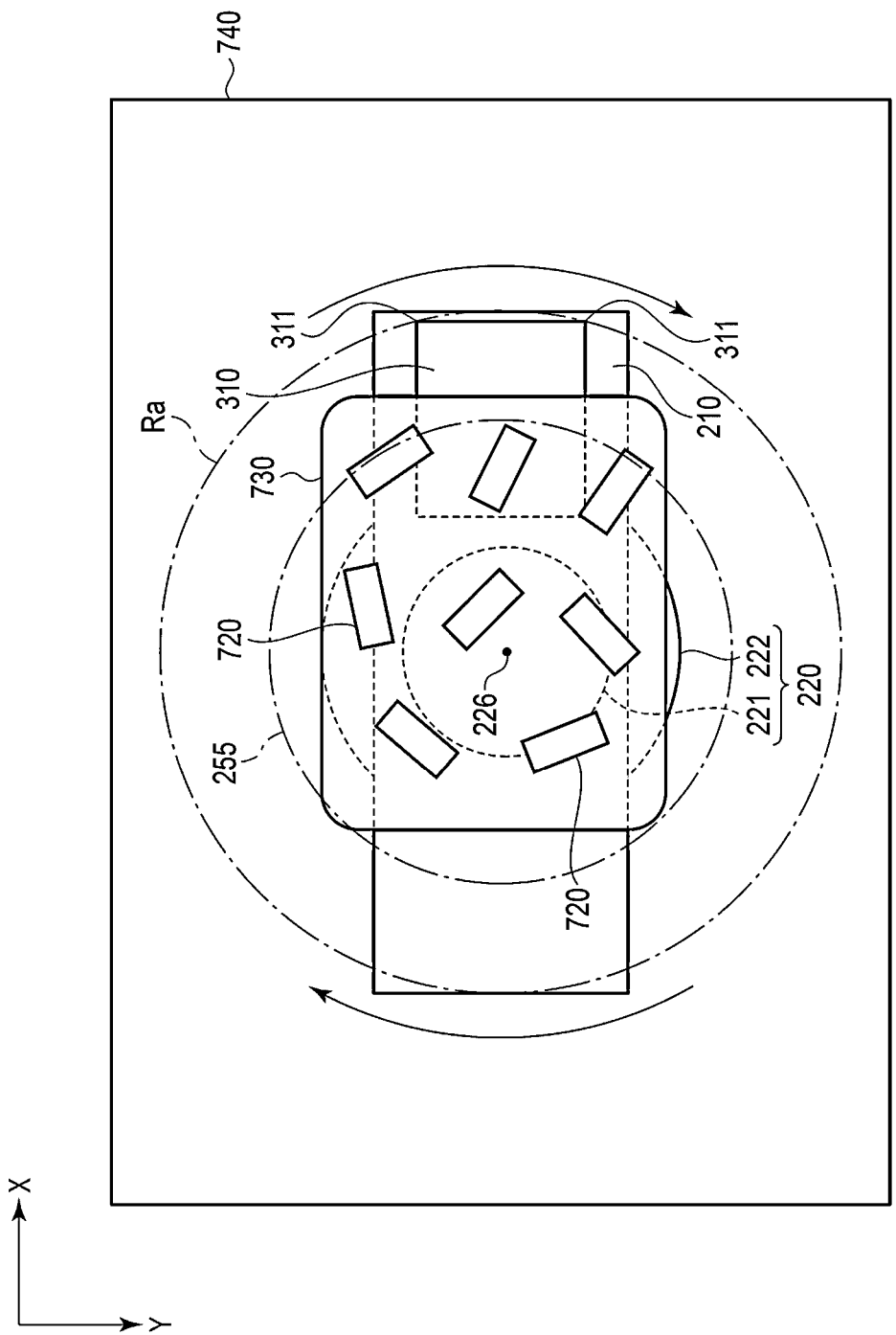
FIG. 4 is a plan view schematically showing the example of the configuration of the wireless tag communication apparatus.

Hereinafter, a first embodiment of the wireless tag communication apparatus 10 will be described with reference to FIGS. 3 and 4. FIG. 3 is a side view schematically showing an example of a configuration of the wireless tag communication apparatus 10 according to the first embodiment. FIG. 4 is a plan view schematically showing the example of the configuration of the wireless tag communication apparatus 10 according to the first embodiment. In FIGS. 3 and 4, the article 710 is not shown, and only the wireless tag 720 is shown.

The wireless tag communication apparatus 10 according to the first embodiment includes an antenna 310. The antenna 310 is movably held by the drive apparatus 200. The drive apparatus 200 is provided under a table 740 where the article 710 (for example, a commodity) attached with the wireless tag 720 is placed. That is, the antenna 310 is movably disposed below the table 740.

The table 740 is a horizontally held plate-like member. A placement range Ra is set on an upper surface of the table 740. The placement range Ra is a range in which the wireless tag 720 is assumed in advance to be placed. For example, the placement range Ra is a range in which the article 710 attached with the wireless tag 720 or a basket 730 (for example, shopping basket) containing the article 710 is placed. For example, a contour of the placement range Ra is a circle. However, the contour of the placement range Ra is not limited thereto, and may be, for example, a polygon, rectangle, or an ellipse.

The drive apparatus 200 moves the antenna 310. The drive apparatus 200 includes a stage 210 that holds the antenna 310 and a movement mechanism 220 that moves the stage 210.

The stage 210 holds the antenna 310 such that a radiating surface of the antenna 310 faces the table 740. The stage 210 includes a base plate 231 and a tilted holding portion 232.

The base plate 231 is held horizontally by the movement mechanism 220. For example, the base plate 231 is a rectangular plate-like member.

The tilted holding portion 232 stands upright on the base plate 231. The tilted holding portion 232 tilts and holds the antenna 310 such that the radiating surface of the antenna 310 faces upward of the placement range Ra.

The movement mechanism 220 is a rotation mechanism that rotates the stage 210 around a rotation center shaft 226. The movement mechanism 220 includes a holding portion 221 and a motor 222.

The holding portion 221 horizontally holds the stage 210. That is, the holding portion 221 holds the stage 210 parallel to the table 740. The holding portion 221 is fixed to a rotating shaft of the motor 222.

The motor 222 rotates the holding portion 221 around the rotation center shaft 226. The rotation center shaft 226 is perpendicular to a horizontal plane. That is, the rotation center shaft 226 is parallel to a vertical axis.

The movement mechanism 220 rotates the stage 210 around the rotation center shaft 226. Accordingly, the antenna 310 moves along a circumference of a circle 225 or along a perimeter of a polygon.

The wireless tag communication apparatus 10 reads information from the wireless tag 720 attached to the article 710. The wireless tag communication apparatus 10 regards the wireless tag 720 within the placement range Ra as a target to be read. However, the wireless tag communication apparatus 10 may also read information from a wireless tag 720 not to be read which is located outside the placement range Ra on the table 740. In particular, when the wireless tag 720 not to be read is near the placement range, the wireless tag communication apparatus 10 is highly likely to erroneously read information from the wireless tag 720 not to be read.

In order to avoid such erroneous reading, the wireless tag communication apparatus 10 detects the wireless tag 720, determines whether the detected wireless tag 720 is within the placement range Ra, regards only the wireless tag 720 within the placement range Ra as the target to be read, and reads information from only the wireless tag 720 that is the target to be read.

In one example, the position determination of whether the wireless tag 720 is within the placement range Ra is performed, based on a phase difference that is an amount of phase change, by moving the antenna 300 and measuring a phase of the wireless tag 720. In another example, tag data of the wireless tag 720 is acquired at a plurality of positions by moving the antenna 300, and a trained model generated by machine learning using the tag data as an input is used.

When performing measurement, the wireless tag communication apparatus 10 requests a user of the wireless tag communication apparatus 10 to place the wireless tag 720 within the placement range Ra. Here, the measurement includes detection of the wireless tag 720, position determination of the wireless tag 720, and reading of information from the wireless tag 720.

Therefore, the wireless tag communication apparatus 10 determines whether the wireless tag 720 is within the placement range Ra based on information from the sensor 500, and when the wireless tag 720 is at least partially out of the placement range Ra, the wireless tag communication apparatus 10 performs notification through the notification apparatus 600 to prompt the user to correct the position of the wireless tag 720.

For example, when the article 710 attached with the wireless tag 720 or the basket 730 containing the article 710 extends beyond the placement range Ra, the wireless tag communication apparatus 10 performs notification to prompt the user to correct the position of the article 710 or the basket 730. If the article 710 or the basket 730 is within the placement range Ra, it is guaranteed that the wireless tag 720 is within the placement range Ra.

The drive apparatus 200 two-dimensionally moves the antenna 310 inside the placement range Ra. Here, the two-dimensional movement of the antenna 310 means that, when two independent axes, for example, an X-axis and a Y-axis orthogonal to each other are set in a plane parallel to the upper surface of the table 740, coordinates along the two axes of the antenna 310, for example, an X coordinate and a Y coordinate both change regardless of the way of setting the axes.

In the present embodiment, the drive apparatus 200 moves the antenna 310 along a circumference of a circle 256 inside the placement range Ra. For example, the contour of the placement range Ra is a circle that matches with a trajectory drawn by an outermost point 311 of the antenna 310 when the stage 210 is rotated around the rotation center shaft 226.

In other words, the placement range Ra is set to a circle according to the trajectory of the antenna 310 such that the wireless tag 720 within the placement range Ra is preferentially detected with high accuracy. This is based on a concept that the wireless tag communication apparatus 10 detects the wireless tag 720 within the placement range Ra more easily than the wireless tag 720 outside the placement range Ra.

The placement range Ra is not necessarily limited to a range that matches the circle. The placement range Ra may be set to a range wider or narrower than the circle. The shape of the placement range Ra is not limited to a circle, and may be another shape. However, as the placement range Ra becomes wider than the circle, frequency of detecting the non-target wireless tag 720 increases, conversely, as the placement range Ra becomes narrower than the circle, frequency of missing the target wireless tag 720 for detection increases, and thus it is preferable that the placement range Ra is set in a range close to the circle.

Figure 5:
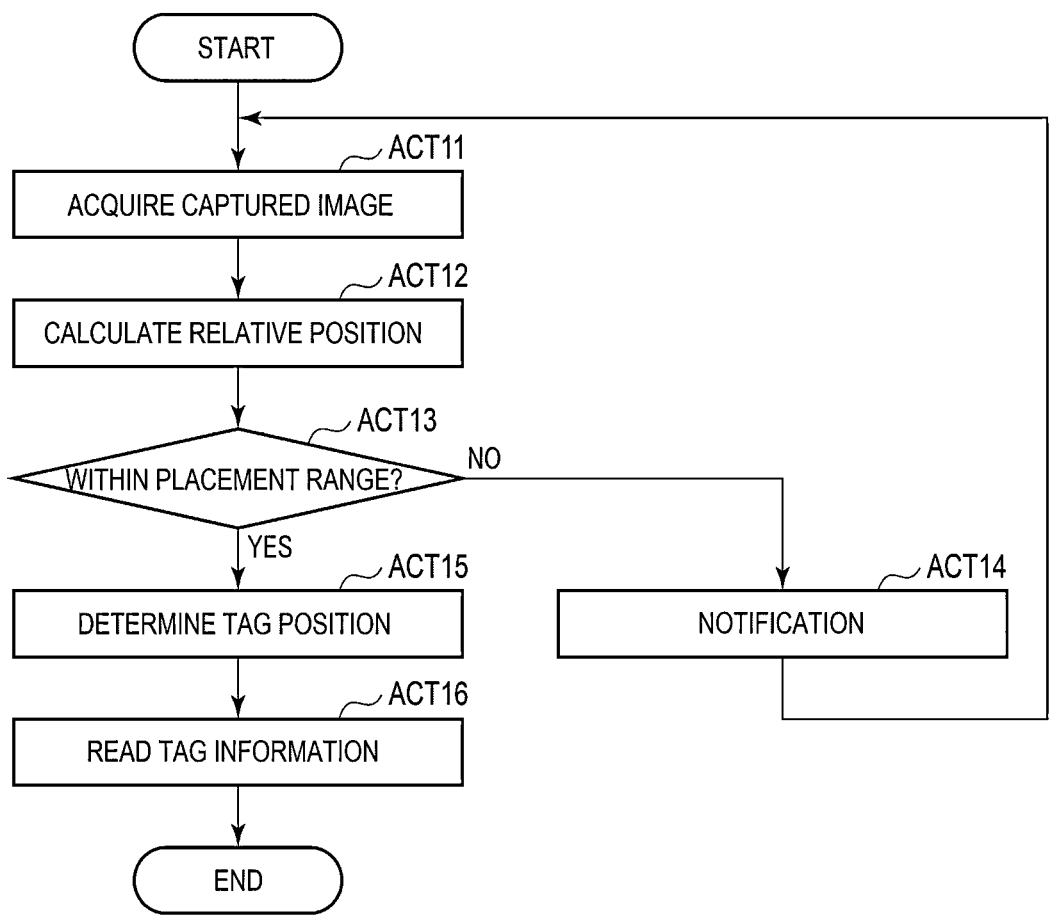
FIG. 5 is a flowchart showing a flow of an example of an operation of the wireless tag communication apparatus.

Hereinafter, an example of an operation of the wireless tag communication apparatus 10 according to the present embodiment will be described with reference to FIG. 5. FIG. 5 is a flowchart showing a flow of an example of the operation of the wireless tag communication apparatus 10 according to the present embodiment.

First, in ACT 11, the reading apparatus 100 acquires information including the position information of the wireless tag 720 from the sensor 500. For example, the sensor 500 is a camera, and the reading apparatus 100 acquires an image captured by the camera.

Then, in ACT 12, the reading apparatus 100 calculates, by an image processing technique, a relative position between the wireless tag 720 and the placement range Ra based on the acquired captured image. For example, when the article 710 attached with the wireless tag 720 is placed alone on the table 740, the reading apparatus 100 calculates a relative position between the article 710 and the placement range Ra. When the article 710 attached with the wireless tag 720 is contained in the basket 730 and placed on the table 740, the reading apparatus 100 calculates a relative position between the basket 730 and the placement range Ra.

Position information of the placement range Ra necessary at that time may be acquired using an image processing technique by marking a circle or the like indicating the placement range Ra on the table 740 in advance, or information on the placement range Ra may be stored in advance.

Subsequently, in ACT 13, the reading apparatus 100 determines whether the wireless tag 720 is within the placement range Ra. Therefore, the reading apparatus 100 determines whether the article 710 or the basket 730 is within the placement range Ra. If the article 710 or the basket 730 is within the placement range Ra, it is guaranteed that the wireless tag 720 is within the placement range Ra.

For example, whether the article 710 or the basket 730 is within the placement range Ra can be determined based on whether a contour of the article 710 or the basket 730 is located inside the placement range Ra without overlapping the contour of the placement range Ra.

When the article 710 or the basket 730 is not within the placement range Ra (NO in ACT 13), in ACT 14, the reading apparatus 100 performs notification for prompting correction of the position of the article 710 or the basket 730 by the notification apparatus 600. Thereafter, the reading apparatus 100 returns to the processing in ACT11 and performs the processing of ACT11 to ACT13 again.

When the article 710 or the basket 730 is within the placement range Ra (YES in ACT 13), in ACT 15, the reading apparatus 100 detects the wireless tag 720 and determines whether the wireless tag 720 is within the placement range Ra for each detected wireless tag 720.

Then, in ACT 16, the reading apparatus 100 reads information from the wireless tag 720 within the placement range Ra.

In the wireless tag communication apparatus 10 according to the present embodiment, the drive apparatus 200 two-dimensionally moves the antenna 310 inside the placement range Ra. For example, the drive apparatus 200 moves the antenna 310 along the circumference of the circle 225 inside the placement range Ra. Therefore, the electromagnetic wave emitted from the antenna 310 is emitted more to the inside of the placement range Ra and is emitted less to the outside of the placement range Ra. Therefore, the wireless tag communication apparatus 10 can detect the target wireless tag 720 within the placement range Ra with high accuracy and selectively read the information of the target wireless tag 720.

The stage 210 holds the antenna 310 such that the radiating surface of the antenna 310 faces the table 740. This also contributes to improvement in detection accuracy of the target wireless tag 720.

Second Embodiment

Figure 6:
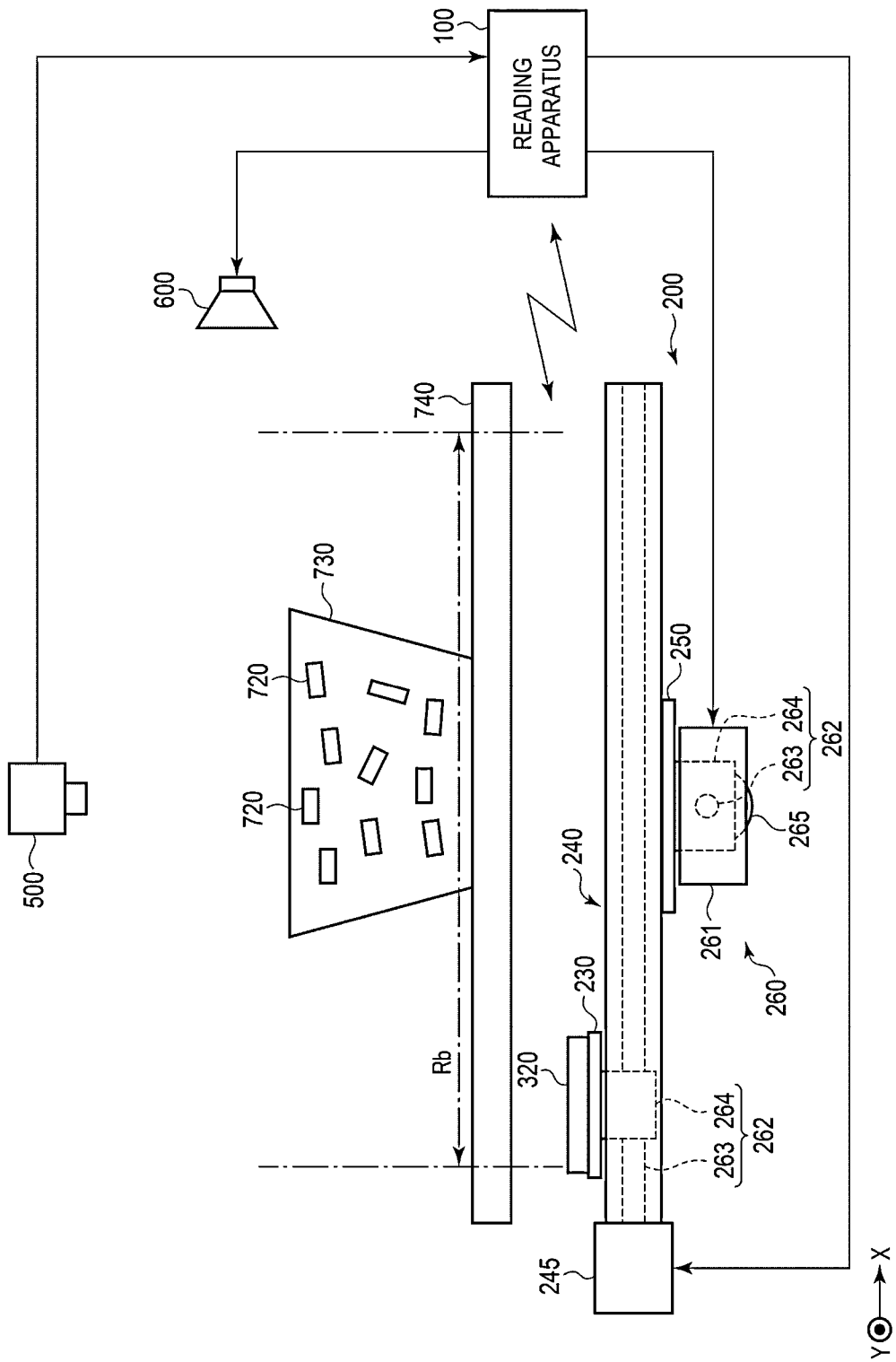
FIG. 6 is a side view schematically showing an example of a configuration of a wireless tag communication apparatus according to a second embodiment.

Next, a second embodiment of the wireless tag communication apparatus 10 will be described with reference to FIGS. 6 and 7. FIG. 6 is a side view schematically showing an example of a configuration of the wireless tag communication apparatus 10 according to the second embodiment. FIG. 7 is a plan view schematically showing the example of the configuration of the wireless tag communication apparatus 10 according to the second embodiment. FIGS. 6 and 7 correspond to FIGS. 3 and 4, respectively. In FIGS. 6 and 7, similarly to FIGS. 3 and 4, the article 710 is not shown. The following description will focus on differences from the first embodiment.

The wireless tag communication apparatus 10 according to the second embodiment includes an antenna 320. The antenna 320 is movably held by the drive apparatus 200 provided below the table 740. A placement range Rb is set on the upper surface of the table 740.

The drive apparatus 200 moves the antenna 320 along two axes, that is, an X-axis and a Y-axis that are parallel to the horizontal plane and perpendicular to each other. Therefore, the drive apparatus 200 includes a stage 230 that holds the antenna 320, a movement mechanism 240 that moves the stage 230, a stage 250 that holds the movement mechanism 240, and a movement mechanism 240 that moves the stage 250.

The stage 230 holds the antenna 320 such that a radiating surface of the antenna 320 faces the table 740. For example, the stage 230 is a rectangular plate-like member.

The movement mechanism 240 is a linear motion mechanism that linearly moves the stage 230 in an X-axis direction. The movement mechanism 240 includes a guide rail 241 and a motor 245. The guide rail 241 holds the stage 230 in a manner that allows linear movement in the X-axis direction. For example, the guide rail 241 includes a ball screw 242 therein. The ball screw 242 includes a rotatable screw shaft 243 and a nut 244 movable along the screw shaft 243 along with rotation of the screw shaft 243. The nut 244 holds the stage 230. The motor 245 rotates the screw shaft 243. Rotational motion of the screw shaft 243 is converted into linear motion of the nut 244.

Therefore, the stage 230 is linearly moved in the horizontal direction (X-axis direction) by rotating the motor 245. For example, the stage 230 is linearly moved in a +X direction by rotating the motor 245 forward, and the stage 230 is linearly moved in a −X direction by rotating the motor 245 backward. That is, the stage 230 reciprocates in the X-axis direction by switching a rotation direction of a shaft of the motor 245. Accordingly, the antenna 320 held by the stage 230 reciprocates in the X-axis direction.

The stage 250 holds the movement mechanism 240 horizontally. Specifically, the stage 250 holds the movement mechanism 240 such that a movement direction of the movement mechanism 240 is horizontal. For example, the stage 250 is a rectangular plate-like member.

A movement mechanism 260 is a linear motion mechanism that linearly moves the stage 250 in a Y-axis direction. The movement mechanism 260 has the same configuration as that of the movement mechanism 240. That is, the movement mechanism 260 includes a guide rail 261 and a motor 265. The guide rail 261 holds the stage 250 in a manner that allows linear movement in the Y-axis direction. For example, the guide rail 261 includes a ball screw 262 therein. The ball screw 262 includes a rotatable screw shaft 263 and a nut 264 movable along the screw shaft 263 along with rotation of the screw shaft 263. The nut 264 holds the stage 250. The motor 265 rotates the screw shaft 263. Rotational motion of the screw shaft 263 is converted into linear motion of the nut 264.

Therefore, the stage 250 is linearly moved in the horizontal direction (Y-axis direction) by rotating the motor 265. For example, the stage 250 is linearly moved in a +Y direction by rotating the motor 265 forward, and the stage 250 is linearly moved in a −Y direction by rotating the motor 265 backward. That is, the stage 250 reciprocates in the Y-axis direction by switching a rotation direction of a shaft of the motor 265. Accordingly, the movement mechanism 240 held by the stage 250 reciprocates in the Y-axis direction, and the antenna 320 held by the movement mechanism 240 reciprocates in the Y-axis direction.

The drive apparatus 200 two-dimensionally moves the antenna 310 inside the placement range Rb. In the present embodiment, the drive apparatus 200 moves the antenna 310 along the two axes inside the placement range Rb.

For example, as shown in FIG. 7, the placement range Rb is set to a rectangle. The drive apparatus 200 moves the antenna 310 along the two axes, that is, the X-axis and the Y-axis in the placement range Rb, for example, such that the antenna 310 moves along a trajectory including a plurality of straight lines La, Lb, and Lc. The drive apparatus 200 moves the antenna 310 in a so-called zigzag manner.

Specifically, the drive apparatus 200 sequentially moves the antenna 310 from a position Pa to a position Pb, from the position Pb to a position Pc, and from the position Pc to a position Pd. The positions Pa, Pb, Pc, and Pd are positions where upper, lower, left, and right sides of the antenna 310 overlap upper, lower, left, and right sides of the placement range Rb, respectively. Directions of up, down, left, and right correspond to directions in FIG. 7.

In other words, according to the same concept as in the first embodiment, the placement range Rb is set to a rectangle according to the trajectory of the antenna 310 such that the wireless tag 720 within the placement range Rb is preferentially detected with high accuracy. That is, the placement range Rb is set to a rectangle that matches a range in which the antenna 310 is movable by the drive apparatus 200.

Although the placement range Rb does not necessarily match the range in which the antenna 310 is movable by the drive apparatus 200, it is preferable to set the placement range Rb to a range close to the rectangle of the range in which the antenna 310 is movable by the drive apparatus 200 according to the same concept as in the first embodiment.

A trajectory between two positions among Pa, Pb, Pc, and Pd is not limited to a straight line, and may be a curve.

In the wireless tag communication apparatus 10 according to the present embodiment, the drive apparatus 200 two-dimensionally moves the antenna 310 inside the placement range Rb. For example, the drive apparatus 200 moves the antenna 310 in a zigzag manner inside the placement range Rb. Therefore, an electromagnetic wave emitted from the antenna 310 is emitted more to the inside of the placement range Rb and is emitted less to the outside of the placement range Rb. Therefore, the wireless tag communication apparatus 10 can detect the target wireless tag 720 within the placement range Rb with high accuracy and selectively read the information of the target wireless tag 720.

Third Embodiment

Next, a third embodiment of the wireless tag communication apparatus 10 will be described with reference to FIGS. 8 and 9. FIG. 8 is a side view schematically showing an example of a configuration of the wireless tag communication apparatus 10 according to the third embodiment. FIG. 9 is a plan view schematically showing the example of the configuration of the wireless tag communication apparatus 10 according to the third embodiment. FIGS. 8 and 9 correspond to FIGS. 3 and 4, respectively. However, unlike FIG. 3, an orientation of a paper surface in FIG. 8 is perpendicular to the X-axis. In FIGS. 8 and 9, similarly to FIGS. 3 and 4, the article 710 is not shown. The following description will focus on differences from the first embodiment.

The wireless tag communication apparatus 10 according to the third embodiment includes two antennas 330 and 340. The two antennas 330 and 340 are movably held by the drive apparatus 200 provided below the table 740. A placement range Rc is set on the upper surface of the table 740.

The drive apparatus 200 moves the two antennas 330 and 340 along the X-axis parallel to the horizontal plane. Therefore, the drive apparatus 200 includes a stage 270 that holds the two antennas 330 and 340, and a movement mechanism 280 that moves the stage 270.

The stage 270 holds the two antennas 330 and 340 such that radiating surfaces of the two antennas 330 and 340 face the table 740.

The stage 270 holds the antennas 330 and 340 at a predetermined interval such that the radiating surfaces of the antennas 330 and 340 face the table 740. The stage 270 includes a base plate 271 and two tilted holding portions 272 and 273.

The base plate 271 is held horizontally by the movement mechanism 280. For example, the base plate 271 is a rectangular plate-like member.

The two tilted holding portions 272 and 273 stand upright on the base plate 271. The tilted holding portion 272 tilts and holds the antenna 330 such that the radiating surface of the antenna 330 faces upward of the placement range Rc. The tilted holding portion 273 tilts and holds the antenna 340 such that the radiating surface of the antenna 340 faces upward of the placement range Rc. The tilted holding portions 272 and 273 tilt and hold the antennas 330 and 340 such that the radiating surfaces of the antennas 330 and 340 face each other.

The movement mechanism 280 is a linear motion mechanism that linearly moves the stage 270 in the X-axis direction. The movement mechanism 280 includes a guide rail 281 and a motor 285. The guide rail 281 holds the stage 270 in a manner that allows linear movement in the X-axis direction. For example, the guide rail 281 holds the stage 270 at an intermediate portion between the two antennas 330 and 340. For example, the guide rail 281 includes a ball screw 282 therein. The ball screw 282 includes a rotatable screw shaft 283 and a nut 284 movable along the screw shaft 283 along with rotation of the screw shaft 283. The nut 284 holds the stage 270. The motor 285 rotates the screw shaft 283. Rotational motion of the screw shaft 283 is converted into linear motion of the nut 284.

Therefore, the stage 270 is linearly moved in the horizontal direction (X-axis direction) by rotating the motor 285. For example, the stage 270 is linearly moved in the +X direction by rotating the motor 285 forward, and the stage 270 is linearly moved in the −X direction by rotating the motor 285 backward. That is, the stage 270 reciprocates in the X-axis direction by switching a rotation direction of a shaft of the motor 285. Accordingly, the two antennas 330 and 340 held by the stage 270 reciprocate in the X-axis direction.

The drive apparatus 200 moves the two antennas 330 and 340 inside the placement range Rc. In the present embodiment, the drive apparatus 200 moves the two antennas 330 and 340 along the X-axis inside the placement range Rc.

For example, as shown in FIG. 9, the placement range Rc is set to a rectangle. The drive apparatus 200 moves the two antennas 330 and 340 together along the X-axis within the placement range Rc.

Specifically, the drive apparatus 200 moves the antenna 330 from a position Pe to a position Pf and moves the antenna 340 from a position Pg to a position Ph. The positions Pe and Pf are positions where an upper side of the antenna 330 overlaps an upper side of the placement range Rc and left and right sides of the antenna 330 overlap left and right sides of the placement range Rc, respectively. The positions Pg and Ph are positions where a lower side of the antenna 340 overlaps a lower side of the placement range Rc and left and right sides of the antenna 340 overlap the left and right sides of the placement range Rc, respectively. Directions of up, down, left, and right correspond to directions in FIG. 9.

In other words, according to the same concept as in the first embodiment, the placement range Rc is set to a rectangle according to trajectories of the antennas 330 and 340 such that the wireless tag 720 within the placement range Rc is preferentially detected with high accuracy. That is, the placement range Rc is set to a rectangle surrounding a range in which the antennas 330 and 340 are movable by the drive apparatus 200.

Although the placement range Rc does not necessarily match the rectangle surrounding the range in which the antennas 330 and 340 are movable by the drive apparatus 200, it is preferable to set the placement range Rc to a range close to the rectangle surrounding the range in which the antennas 330 and 340 are movable by the drive apparatus 200 according to the same concept as in the first embodiment.

The wireless tag communication apparatus 10 according to the present embodiment includes the two antennas 330 and 340, and the drive apparatus 200 moves the two antennas 330 and 340 together inside the placement range Rc. This provides the same effect as moving one antenna two-dimensionally inside the placement range Rc. That is, electromagnetic waves emitted from the two antennas 330 and 340 are emitted more to the inside of the placement range Rc and are emitted less to the outside of the placement range Rc.

Therefore, the wireless tag communication apparatus 10 can detect the target wireless tag 720 within the placement range Rc with high accuracy and selectively read the information of the target wireless tag 720.

While certain embodiments have been described, these embodiments have been presented by way of examples only, and are not intended to limit the scope of the disclosure. These novel embodiments can be implemented in various other forms, and various omissions, substitutions, and modifications can be made in a range not departing from the gist of the disclosure. The embodiments and the modifications thereof are included in the scope and the gist of the disclosure, and are included in the scope of the disclosure disclosed in the claims and equivalents thereof.

What is claimed is:

1. A wireless tag communication apparatus, comprising:
   at least one antenna disposed below a table where an article attached with a wireless tag is placed;
   a reading apparatus configured to
      communicate with the wireless tag via the antenna,
      detect the wireless tag within a placement range on the table where the article is placed, and
      read information from the wireless tag within the placement range; and
   a drive apparatus configured to move the antenna inside the placement range, wherein
   the drive apparatus moves the antenna along two axes such that the antenna moves along a trajectory including a plurality of straight lines.

2. The wireless tag communication apparatus according to claim 1, further comprising:
   a sensor configured to acquire position information of the wireless tag; and
   a notification apparatus configured to perform information notification, wherein
   the reading apparatus determines a relative position between the placement range and the wireless tag, and causes the notification apparatus to perform notification of information for prompting correction of a position of the article when the wireless tag is at least partially out of the placement range.

3. The wireless tag communication apparatus according to claim 2, wherein
   the sensor is a camera.

4. The wireless tag communication apparatus according to claim 1, wherein
   the drive apparatus moves the antenna such that the antenna moves along a perimeter of a polygon or a circumference of a circle.

5. The wireless tag communication apparatus according to claim 1, wherein
   the two axes are perpendicular with each other.

6. The wireless tag communication apparatus according to claim 1, wherein
   the two axes are parallel with each other.

7. The wireless tag communication apparatus according to claim 1, wherein
   the drive apparatus includes
      a stage configured to hold the antenna in a tilted manner such that a radiating surface of the antenna faces upward of the placement range, and
      a movement mechanism configured to move the stage.

8. The wireless tag communication apparatus according to claim 1, wherein
   the reading apparatus is further configured not to detect the wireless tag that is outside of the placement range.

9. A wireless tag communication apparatus, comprising:
at least one antenna disposed below a table where an article attached with a wireless tag is placed;
a reading apparatus configured to
communicate with the wireless tag via the antenna,
detect the wireless tag within a placement range on the table where the article is placed, and
read information from the wireless tag within the placement range; and
a drive apparatus configured to move the antenna inside the placement range, wherein
the drive apparatus moves the antenna in a two dimensional direction parallel with a placing surface of the table.

10. The wireless tag communication apparatus according to claim 9, further comprising:
a sensor configured to acquire position information of the wireless tag; and
a notification apparatus configured to perform information notification, wherein
the reading apparatus determines a relative position between the placement range and the wireless tag, and causes the notification apparatus to perform notification of information for prompting correction of a position of the article when the wireless tag is at least partially out of the placement range.

11. The wireless tag communication apparatus according to claim 9, wherein
the drive apparatus moves the antenna such that the antenna moves along a perimeter of a polygon or a circumference of a circle.

12. A wireless tag communication method, comprising:
communicating with a wireless tag attached to an article placed on a table with an antenna disposed below the table;
detecting the wireless tag within a placement range on the table where the article is placed;
reading information from the wireless tag within the placement range;
moving the antenna inside the placement range using a drive apparatus; and
moving the antenna along two axes such that the antenna moves along a trajectory including a plurality of straight lines.

13. The wireless tag communication method according to claim 12, further comprising:
acquiring position information of the wireless tag;
performing information notification with a notification apparatus; and
determining a relative position between the placement range and the wireless tag, and causing the notification apparatus to perform notification of information for prompting correction of a position of the article when the wireless tag is at least partially out of the placement range.

14. The wireless tag communication method according to claim 12, further comprising:
using a camera to acquire the position information.

15. The wireless tag communication method according to claim 12, further comprising:
moving the antenna such that the antenna moves along a perimeter of a polygon or a circumference of a circle.

16. The wireless tag communication method according to claim 12, wherein
the two axes are perpendicular with each other.

17. The wireless tag communication method according to claim 12, wherein
the two axes are parallel with each other.

18. The wireless tag communication method according to claim 12, further comprising:
holding, using a stage, the antenna in a tilted manner such that a radiating surface of the antenna faces upward of the placement range; and
moving the stage.

19. The wireless tag communication method according to claim 12, further comprising:
not detecting the wireless tag that is outside of the placement range.

20. The wireless tag communication method according to claim 12, further comprising:
moving the antenna in a two dimensional direction parallel with a placing surface of the table.

* * * * *